US012360685B2

(12) United States Patent
Gupta et al.

(10) Patent No.: US 12,360,685 B2
(45) Date of Patent: Jul. 15, 2025

(54) GENERATING DATA PROTECTION DIRECTIVES TO PROVIDE TO A STORAGE CONTROLLER TO CONTROL ACCESS TO DATA IN CACHE

(71) Applicant: INTERNATIONAL BUSINESS MACHINES CORPORATION, Armonk, NY (US)

(72) Inventors: Lokesh Mohan Gupta, Tucson, AZ (US); Beth Ann Peterson, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/322,931

(22) Filed: May 24, 2023

(65) Prior Publication Data

US 2024/0393962 A1 Nov. 28, 2024

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
CPC .... G06F 3/0622; G06F 3/0655; G06F 3/0673; G06F 21/78; G06F 21/54; G06F 21/602
See application file for complete search history.

(56) References Cited

U.S. PATENT DOCUMENTS

| 10,438,001 | B1 | 10/2019 | Hariprasad |
| 10,496,823 | B2 | 12/2019 | Eytan et al. |
| 10,542,046 | B2 | 1/2020 | Katragadda et al. |
| 10,749,888 | B2 | 8/2020 | Carmichael |
| 10,999,316 | B2 | 5/2021 | Raghunathan et al. |
| 11,134,087 | B2 | 9/2021 | Ford |
| 12,073,104 | B1* | 8/2024 | Avanzi ................. G06F 3/0623 |
| 2005/0091491 | A1* | 4/2005 | Lee ...................... G06F 21/6218 |
| 2013/0073854 | A1* | 3/2013 | Patti ....................... H04L 9/0894 |
| | | | 713/171 |
| 2019/0042115 | A1* | 2/2019 | Anderson ............ G06F 12/0831 |
| 2019/0138459 | A1* | 5/2019 | Briggs ................. G06F 12/0871 |

(Continued)

OTHER PUBLICATIONS

Gopalakrishnan et al., "Deep Learning Enabled Data Offloading With Cyber Attack Detection Model in Mobile Edge Computing Systems", IEEE Access, Oct. 13, 2020, 12pp.

(Continued)

*Primary Examiner* — Michael Krofcheck
(74) *Attorney, Agent, or Firm* — Konrad, Raynes, Davda & Victor LLP; David Victor

(57) ABSTRACT

Provided are a computer program product, system, and method for generating data protection directives to provide to a storage controller to control access to data in cache. A data protection directive is generated for a data subset indicating access request type and a protective action with respect to the access request type for the data subset. The data protection directive is transmitted to the storage controller. The storage controller includes the data protection directive in metadata for the data subset. The data protection directive causes the storage controller to perform the protective action in response to an access request of the access request type to a portion of the data subset.

20 Claims, 6 Drawing Sheets

(56) References Cited

U.S. PATENT DOCUMENTS

| | | | |
|---|---|---|---|
| 2021/0334365 A1 | 10/2021 | Vessels et al. | |
| 2022/0091757 A1* | 3/2022 | Lee | G06F 3/064 |
| 2022/0150265 A1 | 5/2022 | Marett et al. | |
| 2022/0188289 A1 | 6/2022 | Ali et al. | |
| 2022/0327409 A1 | 10/2022 | Dodson et al. | |
| 2022/0358216 A1 | 11/2022 | Qi et al. | |
| 2022/0417274 A1 | 12/2022 | Madanahalli et al. | |
| 2023/0129776 A1* | 4/2023 | Agarwal | H04L 63/102 726/3 |

OTHER PUBLICATIONS

An et al., "Evaluation of Cybersecurity Data Set Characteristics for Their Applicability to Neural Networks Algorithms Detecting Cybersecurity Anomalies", IEEE Access, Aug. 21, 2019, 9 pp.

Sarker et al., "IntruDTree: A Machine Learning Based Cyber Security Intrusion Detection Model", MDPI symmetry, May 6, 2020, 15 pp.

Larriva-Novo et al.; "Evaluation of Cybersecurity Data Set Characteristics for Their Applicability to Neural Networks Algorithms Detecting Cybersecurity Anomalies", IEEE Access, Jan. 15, 2020, 10 pp.

Tao et al., "TrustData: Trustworthy and Secure Data Collection for Event Detection in Industrial Cyber-Physical System", IEEE, 2019, 11 pp.

List of Patents or Patent Applications Treated as Related, 2 pp., May 24, 2023.

U.S. Appl. No. 18/322,893, filed May 24, 2023.

Yu et al., "Multivariate Gaussian-Based False Data Detection Against Cyber-Attacks", Special Section on Artificial Intelligence Technologies for Electric Power Systems, 2019, 9 pages.

* cited by examiner

US 12,360,685 B2

GENERATING DATA PROTECTION DIRECTIVES TO PROVIDE TO A STORAGE CONTROLLER TO CONTROL ACCESS TO DATA IN CACHE

BACKGROUND OF THE INVENTION

1. Field of the Invention

The present invention relates to a computer program product, system, and method for generating data protection directives to provide to a storage controller to control access to data in cache.

2. Description of the Related Art

Cyber resiliency efforts for enterprise data to protect against malicious access and attacks on data, such as ransomware attacks, focus on data recovery to recover data from backups if there is a malicious attack. Enterprise systems may also deploy malware software at servers and client systems, which requires significant computational resources, to perform data validation and execute anomaly detection algorithms to detect potentially malicious activities based on a pattern of accesses.

There is a need in the art for improved techniques to detect malicious and unauthorized access of data and prevent malevolent activity and compromising data.

SUMMARY

Provided are a computer program product, system, and method for generating data protection directives to provide to a storage controller to control access to data in cache. A data protection directive is generated for a data subset indicating access request type and a protective action with respect to the access request type for the data subset. The data protection directive is transmitted to the storage controller. The storage controller includes the data protection directive in metadata for the data subset. The data protection directive causes the storage controller to perform the protective action in response to an access request of the access request type to a portion of the data subset.

DETAILED DESCRIPTION

Described embodiments provide improvements to computer technology for detecting potentially malicious behavior by having a host provide data protection directives to detect access that may be malicious to the storage controller to include in metadata for the data, such as track metadata and volume metadata, which is used by the storage controller operating system to manage data in cache. In this way, the storage controller operating system applies data protection directives included in the track metadata normally processed when accessing tracks in cache. This avoids the need for separate anti-virus software that can have a negative impact on system performance. Instead, the data protection operations are incorporated into the operating system cache management code. Further, by incorporating the data protection directives to detect malicious behavior within the operating system cache management code and operations, malicious processes cannot disable data protection services because to do so would require disabling or interfering with the cache manager, which is needed to access data, or require disabling access to track metadata which is also needed to access data in cache.

The described embodiments allow the storage controller to prevent an attack from corrupting data and protect the data from malware, trusted insiders, or an accidental delete or overwrite. In addition, based on the directives for this protected data, the storage controller can prevent the data from propagating via replication to less controlled environments, which is important for classified or confidential data.

Figure 1:
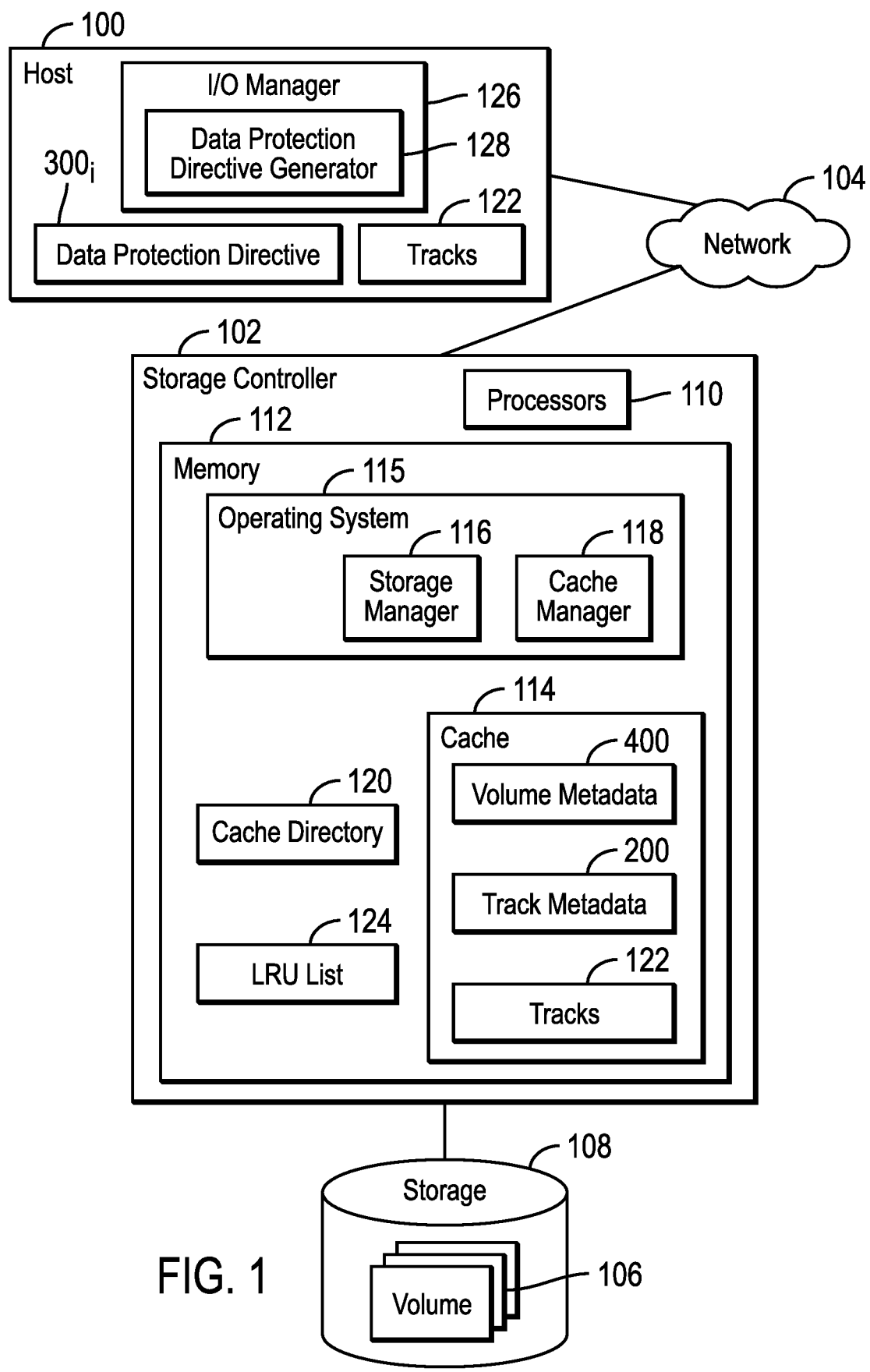
FIG. 1 illustrates an embodiment of a computing environment.

FIG. 1 illustrates an embodiment of a computing environment. A host 100, which may be one of a plurality of similar hosts, may submit Input/Output (I/O) requests to a storage controller 102 over a network 104 to access data in volumes 106 (e.g., Logical Unit Numbers, Logical Devices, Logical Subsystems, etc.) in a storage 108. The storage controller 102 includes one or more processors 110 and a memory 112, including a cache 114 to cache data for the storage 108. The processors 110 may comprise a separate central processing unit (CPU), one or a group of multiple cores on a single CPU, or a group of processing resources on one or more CPUs. The cache 114 buffers data transferred between the host 100 and volumes 106 in the storage 108.

The memory 112 further includes the storage controller operating system 115 comprising a storage manager 116 to manage the transfer of tracks between the host 100 and the storage 108 and a cache manager 118 that manages data transferred between host 100 and the storage 108 in the cache 114; a cache directory 120 providing an index of cache control blocks in the cache 114 having track data 122, track metadata 200 and volume metadata 400; and a least recently used (LRU) list 124 in which to indicate tracks in the cache 114 to determine which track to demote from the cache 114. A track 122 may comprise any unit of data configured in the storage 108, such as a track, Logical Block Address (LBA), storage cell, group of cells (e.g., column, row or array of cells), sector, segment, etc., which may be part of a larger grouping of tracks, such as a volume, logical device, etc.

The cache 114 may store tracks 122 of data written by the hosts 100 or staged from storage 108 to return to read requests. In certain embodiments, there may be one cache control block $200_i$ for each track 122 in the cache 114 and for each instance of track metadata 200 and volume metadata 400 in the cache 114. A cache control block may be stored in a segment of a track in the cache 114. The cache directory 120 may have a pointer to a location in cache 114 where the cache control block segment for a track 122, track metadata 200 or volume metadata 400 is stored.

The host 100 may include an Input/Output (I/O) manager 126 to manage I/O requests submitted by utility applications (not shown), internal (as shown) or external to the host 100. The I/O manager 126 includes a data protection directive generator 128 to generate data protection directives $300_i$ for tracks or volumes to include in track metadata 200, volume metadata 400, and/or in a track record of a track 500 maintained by the storage controller 102. The data protection directives $300_i$ are provided to the storage controller 102 to include in metadata 200, 400 and/or 500 for the protected tracks 122 to use to protect the tracks from malicious access while in cache 114. The cache manager 118, or other component of the storage controller operating system 115, includes code to process the data protection directives 300 to determine whether to allow access to the track based on the data protection directive 300 fields in the track 200 and/or volume metadata 400.

In certain embodiments, the storage controller 102 may comprise an enterprise storage controller, such as the International Business Machines Corporation (IBM®) DS8000™ storage controller. The host 100 may comprise an enterprise host system that includes an operating system such as the IBM® Z/OS® operating system. (IBM, Z/OS and DS800 are registered trademarks of IBM throughout the world).

The storage controller operating system 115, storage manager 116, cache manager 118, I/O manager 126, and data protection directive generator 128 may comprise program code loaded into memory and executed by one or more processors. Alternatively, some or all of the functions may be implemented as microcode or firmware in hardware devices in the host 100 and storage controller 102, such as in Application Specific Integrated Circuits (ASICs).

The storage 108 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 112 may comprise a suitable volatile or non-volatile memory devices, including those described above.

The network 104 may comprise a Storage Area Network (SAN), a Local Area Network (LAN), a Wide Area Network (WAN), the Internet, and Intranet, etc. The hosts 100 may also submit requests on the low latency cannel (not shown), which may comprise a bus interface, such as a Peripheral Component Interconnect (PCI) bus interface and other interfaces known in the art.

Figure 2:
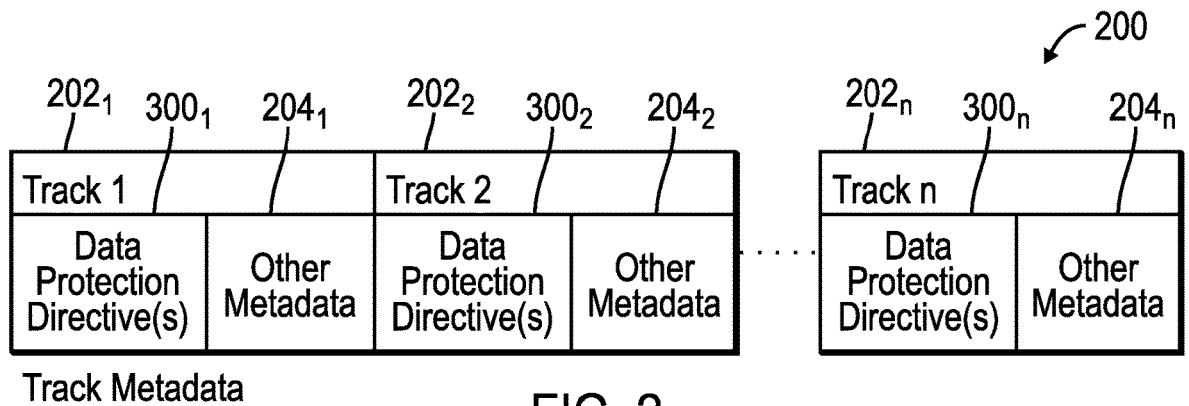
FIG. 2 illustrates an embodiment of track metadata for multiple tracks.

FIG. 2 illustrates an embodiment of track metadata 200 providing metadata $202_1 \ldots 202_n$ for a plurality of tracks $1 \ldots n$ in cache 114, and includes, for each track for which the track metadata is provided, one or more data protection directives $300_1 \ldots 300_n$ generated by the host data protection directive generator 128 and other metadata $204_1 \ldots 204_n$ track metadata typically provides for tracks. The track metadata 200 is destaged to storage 108 when the tracks 122 for which the track metadata 200 is provided are destaged from cache 114.

The data protective directive fields $300_1 \ldots 300_n$ in the track metadata 200 may include a null indicator when no data protection directive is provided and access may continue without performing a protective action.

In the embodiment of FIG. 2, the track metadata 200 includes the data protection directive field, provided by the host 100, for each track. In a further embodiment, the track metadata 200 may provide metadata for a subset of tracks, logically or physically sequential or non-sequential, such as an extent or data set and one or more data protection directives to apply to a subset of multiple tracks.

Figure 3:
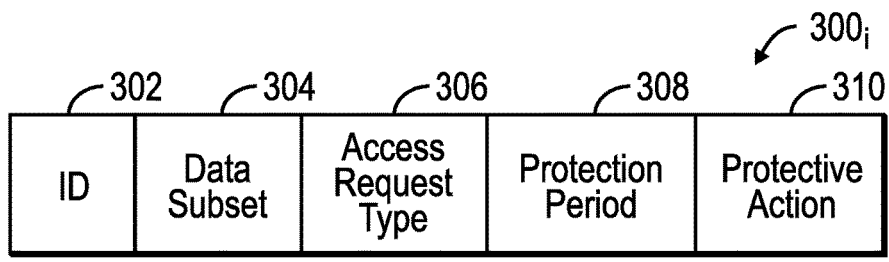
FIG. 3 illustrates an embodiment of a data protection directive included in metadata for tracks.

FIG. 3 illustrates an embodiment of a data protection directive $300_i$ generated by the data protection directive generator 128 to cause the storage controller 102 to perform a check of an access request to determine if the access request to the track $122_i$, for which data protection directive $300_i$ is provided, is potentially malicious. The data protection directive $300_i$ includes: an identifier (ID) 302; data subset 304 to which the directive 302 applies, such as a grouping of tracks, a single track, a dataset, an extent of tracks, a logical partition, e.g., a volume, a portion of a track, such as a record, and any other unit of data, where a track may comprise any addressable unit of data; an access request type 306 to which the directive 302 applies, such as a read, write, destage, replication, point-in-time copy, specified multiple access request types, any request type, etc.; a protection period 308 indicating one or more time periods during which the directive 302 applies, where the protection period 308 may be null, indicating the directive 302 is applicable at all times; and a protective action 310 to take to determine whether access should be permitted to a request of the access request type 306 to the data subset 304.

When there is an access request to a data subset 304 of a specific access request type 306 during the protection period 308 for one or more data protection directives $300_i$, the one or more data protection directives $300_i$ may optionally indicate one or more additional actions, such as, but not limited to: for a write request, create a backup copy of the portion of data subset 304 subject to the write request before allowing the write to the data subset in the cache 114; return access request denied with a message of an unauthorized access and indicate the data protective action 302 has been breached; prevent access to a logical partition including the data subset 304; send a message to an administrator alerting of a breach of a data protection directive; alert logical partitions, other than the logical partition including the data subset, of a breach of the data protection directive; and return success acknowledgment to the access request and generate an alert of suspicious behavior to an administrator or other security program.

The protective action 310 may identify a secure key. In such case, the protective action 310 permits the access if the access request of the specified access request 306 to the data subset 304 presents a key matching the identified secure key and block access if the keys do not match. The protective action 310 may further specify an additional action such as send a message to an administrator of an unauthorized access.

Additionally, the protective action 310 may specify to periodically check upon access when the data was last accessed or check that all copies of the data contain the same information, such as pass the cyclic redundancy check (CRC) code of a protected track or record once it is protected. The protective action 310 may cause the storage controller 102 to periodically determine whether the protected data subset still has the same CRC code or unique secure key, or other type of information that could not be easily sniffed or guessed.

Figure 4:
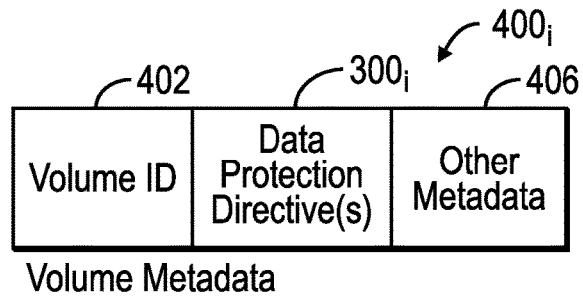
FIG. 4 illustrates an embodiment of volume metadata.

FIG. 4 illustrates an embodiment of volume metadata 400i for a volume i that may be loaded into the cache 114 when a volume is opened to provide data protection directives $300_i$ for a volume i. The volume metadata $300_i$ may include: a volume ID 402, such as a volume number for volume i, a logical unit number (LUN), etc.; one or more data protection directives $300_i$; and other metadata 406 typically provided for the volume 402.

With the volume metadata 400, the host 100 may cause the storage controller 102 to proactively set-aside protected space on the volumes 106 and if there was a write to that area, detect an intrusion. The host 100 may indicate certain portions or cylinders of a volume 106 or logical partitions as specified in the data subset 304, and then the storage controller 102 would know that writes beyond those specified ranges or within a specified forbidden area are unexpected and potentially malicious.

Figure 5:
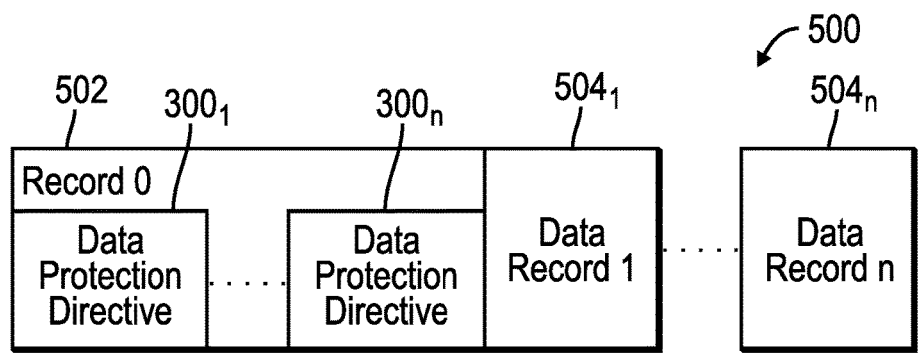
FIG. 5 illustrates an embodiment of a track having data protection directives included in a metadata record of the track to apply to other data records in the track.

FIG. 5 illustrates an embodiment of how a track 500 comprised of a plurality of records may implement the data protection directives $300_i$ in a first or metadata record 502 of the track, where each track record $504_1 \ldots 504_n$ may have its own data protection directive $300_1 \ldots 300_n$, generated by the host 100. The first record 502, record 0 or another designated metadata record, provides a data protection directive $300_1 \ldots 300_n$ for each data record $504_1 \ldots 504_n$ in the track 500, respectively. If there is no data protection directive provided for data record i $504_i$, then the fields or flags in the track metadata record 502 for data protection directive $300_i$ may indicate NULL or no data protection directive. In this way, the data protection directive generator 128 may generate different data protection directives $300_i$ with different types of protection, such as different access types 306, protection time periods 308, and protective actions 310 may be provided for different of the records in a track 500.

FIGS. 2-5 provide examples of how data protection directives $300_i$ are included in metadata for tracks in storage 108 to instruct the cache manager 118 or other storage controller 102 operating system 115 component on how to protect tracks while they are being accessed in cache 114. Other metadata formats may be used to implement the data protection directives $300_i$ in addition to those embodiments described with respect to FIGS. 2-5. For instance, indication of data protective directives could be embedded in other address and control commands to indicate protection, such as a new prefix flag, unique data pattern, secure key passed in parameters or written directly to a track record, etc.

Figure 6:
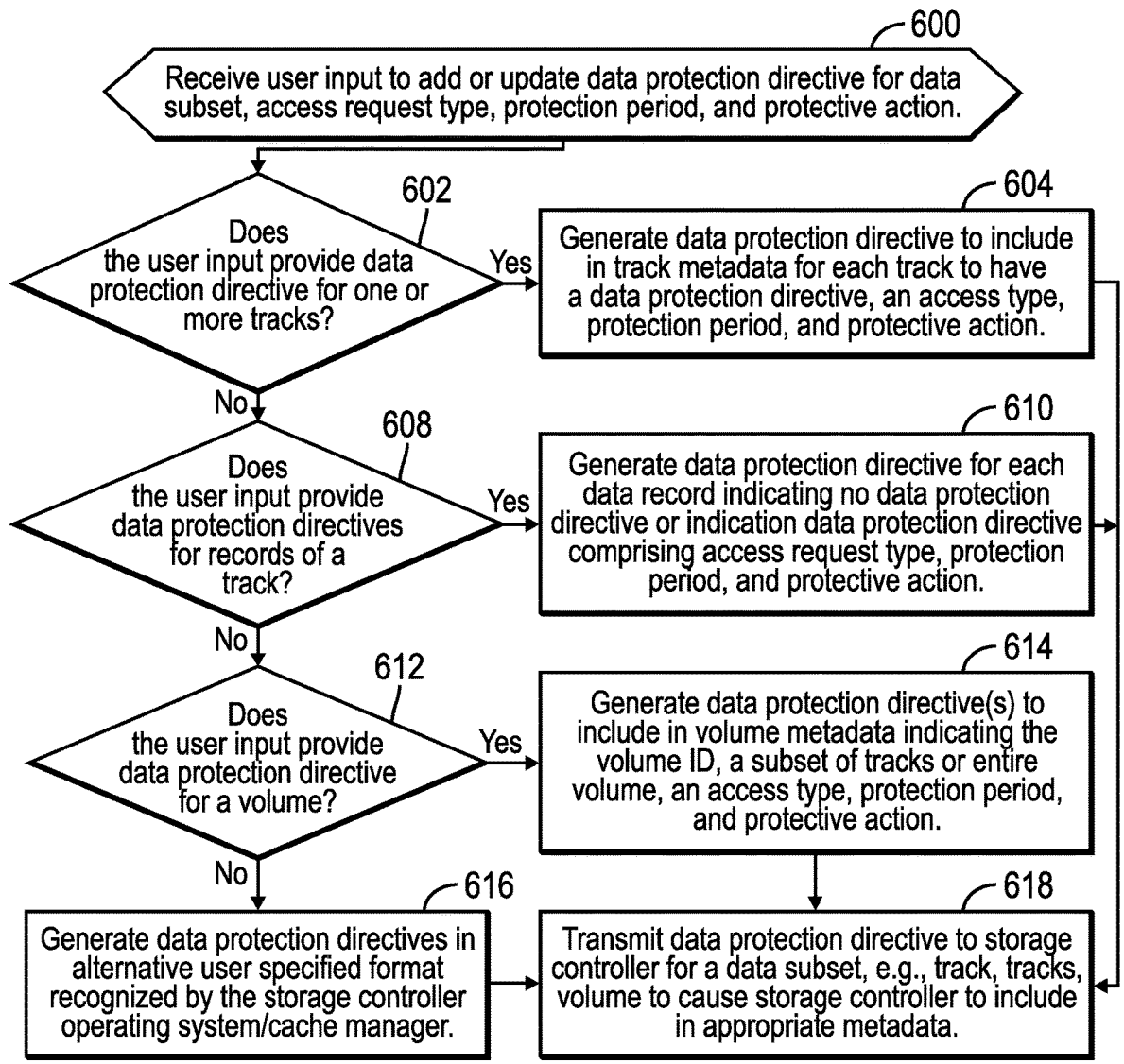
FIG. 6 illustrates an embodiment of operations performed by a host to include data protection directives in metadata for a track.

FIG. 6 illustrates an embodiment of operations performed by the data protection directive generator 128 in a host 100 to generate data protection directives $300_i$ in response to user input via a user interface, such as a command line interface, providing input via a structured file or through graphical user interface. Additionally, the operations of FIG. 6 apply when the user provides updated data protection directives $300_i$ for a track, track records, tracks, volumes, etc. The data protection directives $300_i$ are provided to the storage controller 102 to include in track metadata 200, 500 and/or volume metadata 400. Upon receiving (at block 600) user input to add or update a data protection directive $300_i$ for a data subset 304, access request type 306, protection period 308, and protective action 310, the data protection directive generator 128 determines (at block 602) whether the user input provides a data protection directive $300_i$ for one or more tracks. If so, the data protection directive generator 128 generates (at block 604) a data protection directive $300_i$ for each track indicating the data subset 304, access request type 306, protection period 308 and protective action 310.

If (at block 602) the user input does not provide data protection directives at the track level and instead provides (at block 608) data protection directives for records of a track, the data protection directive generator 128 generates (at block 610) a data protection directive $300_1 \ldots 300_n$ for each record indicating no data protection directive or indication of a data protection directive $300_i$ comprising the identifier 302 of the data protection directive $300_i$, an access request type 306, protection period 308, and protective action 310.

If (at block 608) the user input does not provide data protection directives at the record level and provides (at block 612) data protection directives for a volume 106, then the data protection directive generator 128 generates (at block 614) one or more data protection directive(s) $300_i$ in volume metadata $400_i$ indicating the volume ID 402 to which the directive(s) apply; and one or more data protection directives $300_i$, which may indicate a data subset 304 of the entire volume or a subset of tracks in the volume 402; and any other typical volume metadata 406.

If (at block 612) the user input does not provide data protection directives at the volume level and instead provides other types of data protection directives, the data protection directive generator 128 generates (at block 616) data protection directives in an alternative user specified format recognized by the storage controller 102 operating system 115/cache manager 118. After generating the data protection directives $300_i$, from blocks 604, 610, 614, and 616, the host 100 transmits (at block 618) the generated data protection directives $300_i$ to the storage controller 102 to include in metadata 200, 400, 500 and process to protect against certain types of access of the data defined by the data protection directives $300_i$, which may be considered malicious or unauthorized access.

With the operations FIG. 6, the host 100 side may generate data protection directives for a track and send to the storage controller 102 to cause the storage controller operating system 115 and cache manager 118 to take protective actions as defined in the data protection directives with respect to specified access types of the data in the cache 114.

Figure 7:
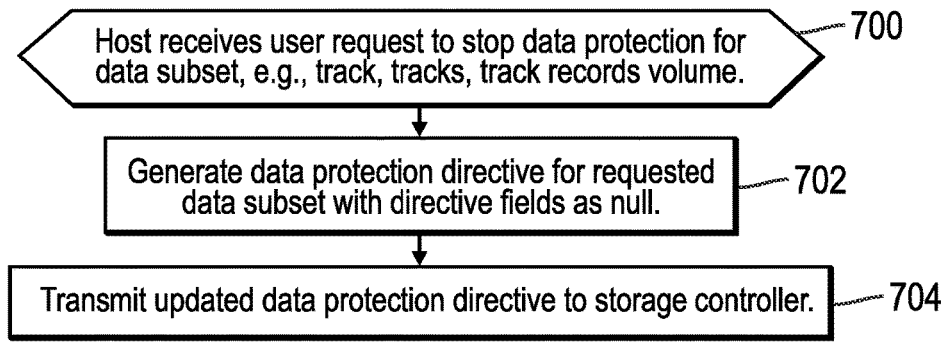
FIG. 7 illustrates an embodiment of operations to remove a data protection directive for a track.

FIG. 7 illustrates an embodiment of operations performed by the data protection directive generator 128 to remove data protection for data at different levels, such as track, volume, track records. Upon receiving (at block 700) a user request to stop data protection for a data subset, e.g., for a track, tracks, track records, volume, etc., the data protection directive generator 128 generates (at block 702) a data protection directive 300; for the specified data subset 204 with fields 306, 308, 310 indicating NULL. The updated data protection directive $300_i$ is transmitted (at block 704) to the storage controller 102 to update the appropriate metadata.

With the embodiment of FIG. 7, an updated data protection directive metadata is generated and provided to the storage controller 102 to include in metadata 200, 400, 500 to remove or cease data protection for a specified data subset.

Figure 8:
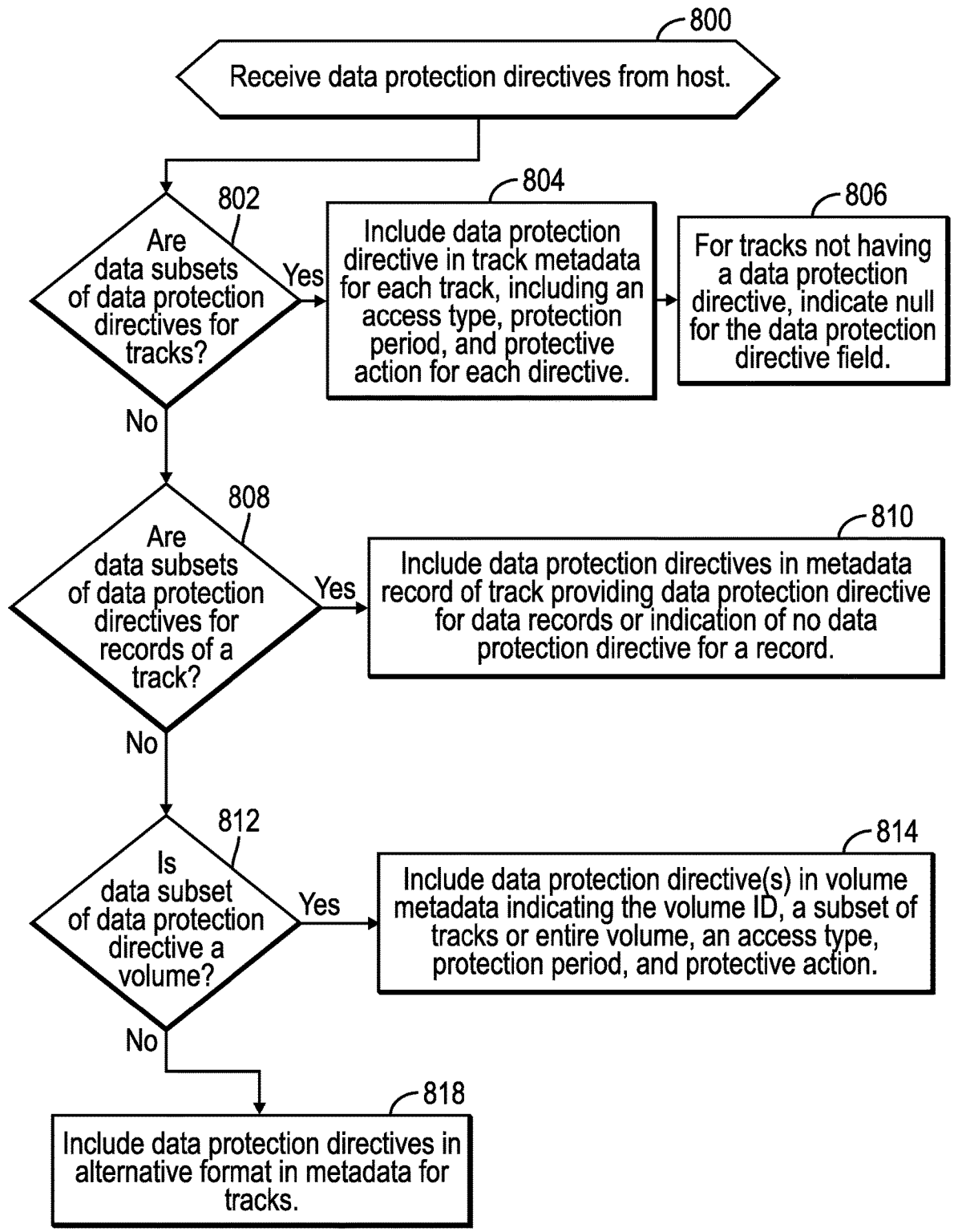
FIG. 8 illustrates an embodiment of operations performed by a storage controller to include data protection directives from a host into metadata maintained by the storage controller.

FIG. 8 illustrates an embodiment of operations performed by the storage controller 102 operating system 115, such as the cache manager 118, to include received data protection directives $300_i$ in metadata. Upon receiving (at block 800) data protection directives $300_i$ from the host 100, if (at block 802) the data subsets 304 of the data protection directives $300_1 \ldots 300_n$ are for tracks $122_1 \ldots 122_n$, then the data protection directive $300_i$, for each track $122_i$, is included (at block 804) in track metadata $202_i$ for each track in the track metadata 200. For tracks not having a data protection directive or a NULL directive, then null is indicated (at block 806) in the data protection directive fields in the track metadata $202_i$ for that track $122_i$. If (at block 808) the data subsets 304 of the data protection directives $300_1 \ldots 300_n$ are for records $504_1 \ldots 504_n$ of a track 500, then the data protection directive $300_i$ for each data record 504; is included (at block 810) in the metadata record 502 of track 500 providing the received data protection directives $300_1 \ldots 300_n$ for each data record or indication of no data protection directive for a record.

If (at block 812) the data subset 304 is a volume, then then the data protection directives $300_i$ are included (at block 814) in volume metadata 400 indicating the volume ID, a subset of tracks or entire volume, an access type, protection period, and protective action. If (at block 812) the data subset 304 is for another type of data unit, then the data protection directives $300_i$ are included (at block 818) in an alternative format in metadata for the tracks.

With the embodiment of FIG. 8, the storage controller 102 adds data protection directives $300_i$ received from the host 100 into the appropriate metadata 200, 400, 500 providing metadata for some level of data, records, track(s), volumes, logical partition, etc. The storage controller 102 may load the metadata 200, 400, 500 including data protection directives $300_i$ into cache 114 and apply to access requests.

Figure 9:
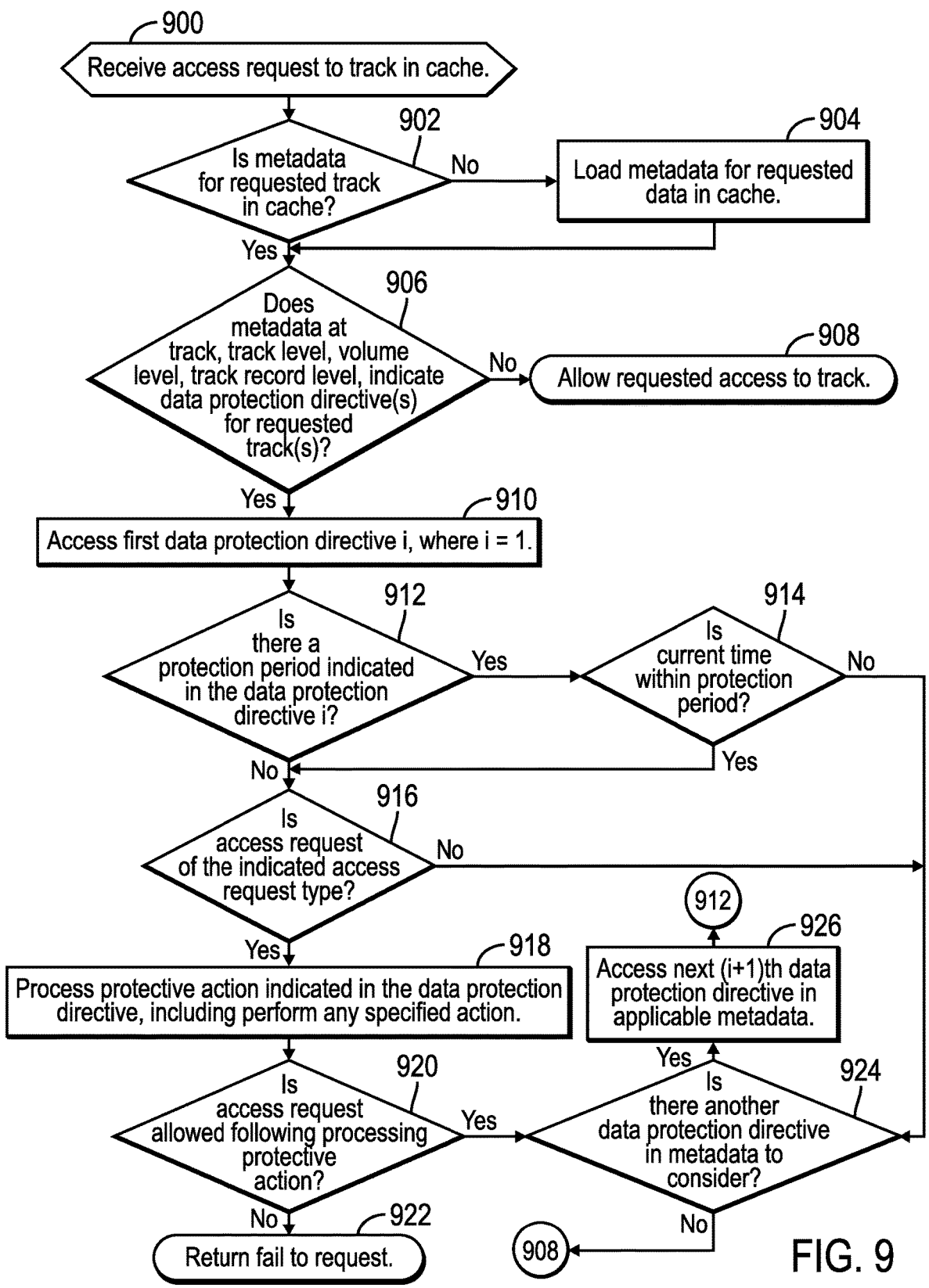
FIG. 9 illustrates an embodiment of operations performed by a storage controller to apply data protection directives in metadata for a track being accessed in cache to determine whether to allow access to the track in the cache.

FIG. 9 illustrates an embodiment of operations performed by the storage controller 102 operating system 115, such as the cache manager 118, to apply data protection directives $300_i$ indicated in metadata 200, 400, 500 in response to receiving (at block 900) an access request to a track in the cache 114. If (at block 902) the metadata 200, 400, 500 for the requested track 122 in cache 114 is not in the cache 114, then the relevant metadata 200, 400, and/or 500 is loaded from storage 108 into the cache 114. Once the metadata for the requested track is in the cache 114 (from the YES branch of block 902 or block 904), then the operating system 115 determines whether the metadata, which may be at one or more levels of track(s) 200, volume 400, an/or track record 500, for the requested track(s) indicates data protection directives $300_i$. If no data protection directives $300_i$ are indicated, then the requested access to the track is allowed (at block 908). If (at block 906) there are relevant data protection directives $300_i$ for the requested track(s), then a first data protection directive $300_i$, where i=1, is accessed (at block 910) from metadata at one or more of track records 500, track subset 200, and/or volume levels 400.

If (at block 912) there is a protection period 308 indicated in the data protection directive $300_i$ then a determination is made (at block 914) whether a current time is within the protection period 308. If not, then the data protection directive $300_i$ does not apply and control proceeds to block 924 to consider a next data protection directive $300_{i+1}$. If (at block 912) there is no specified protection period 308 or if the current time is within the protection period 308, then the operating system 115/cache manager 118 determines (at block 916) whether the access request is of the specified access request type 306, which may indicate a specific type(s) or any type. If (at block 916) the access request is not of the specified type 306, then control proceeds to block 924 to consider a next data protection directive $300_{i+1}$.

If (at block 916) the access request is of the specified access request type 306, then the protective action 310 indicated in the data protection directive $300_i$ is processed (at block 918) to determine whether to allow the access and perform any additional specified actions, such as blocking further access, messaging and administrator of the access, make a backup copy, determine whether the access request provides a key, etc. If (at block 920) the access request is not allowed after processing the protective actions 310, then fail is returned (at block 922) to the access request. Otherwise, if (at block 920) the access request is allowed and if (at block 924) there is a next (i+1)th data protection directive $300_{i+1}$ in applicable metadata 200, 400 and/or 500, then the next, i=(i+1), data protection direction $300_i$ is accessed (at block 926) and control proceeds to block 912 to process that next data protection directive $300_i$. If (at block 924) there is no further data protection directive $300_{i+1}$ to consider, then control proceeds to block 908 to allow the requested access to the track because at this point after processing all data protection directives, no data protection directive $300_i$ resulted in denying access (at block 920) and failing (at block 922) the access request.

With the embodiment of FIG. 9 a component of the storage controller 102 operating system 115, such as the cache manager 118, processes metadata for a track 122 being accessed in cache 114 to determine whether there are data protection directives specified for the track that would prohibit access to the track. With described embodiments, the detection of malicious operations is performed within the storage controller operating system 115 from track metadata 200, 400, and/or 500. Because the data protection operations are embedded in the operating system 115, they are performed very quickly while tracks are being accessed in cache 114 and the data protection operations are not susceptible to interference from malicious actors because they are embedded in basic the operating system 115 required for access in general. In this way, at the operating system level, the storage controller can protect against malicious attacks, including ransomware type attacks if someone tries to maliciously encrypt, delete or modify data.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
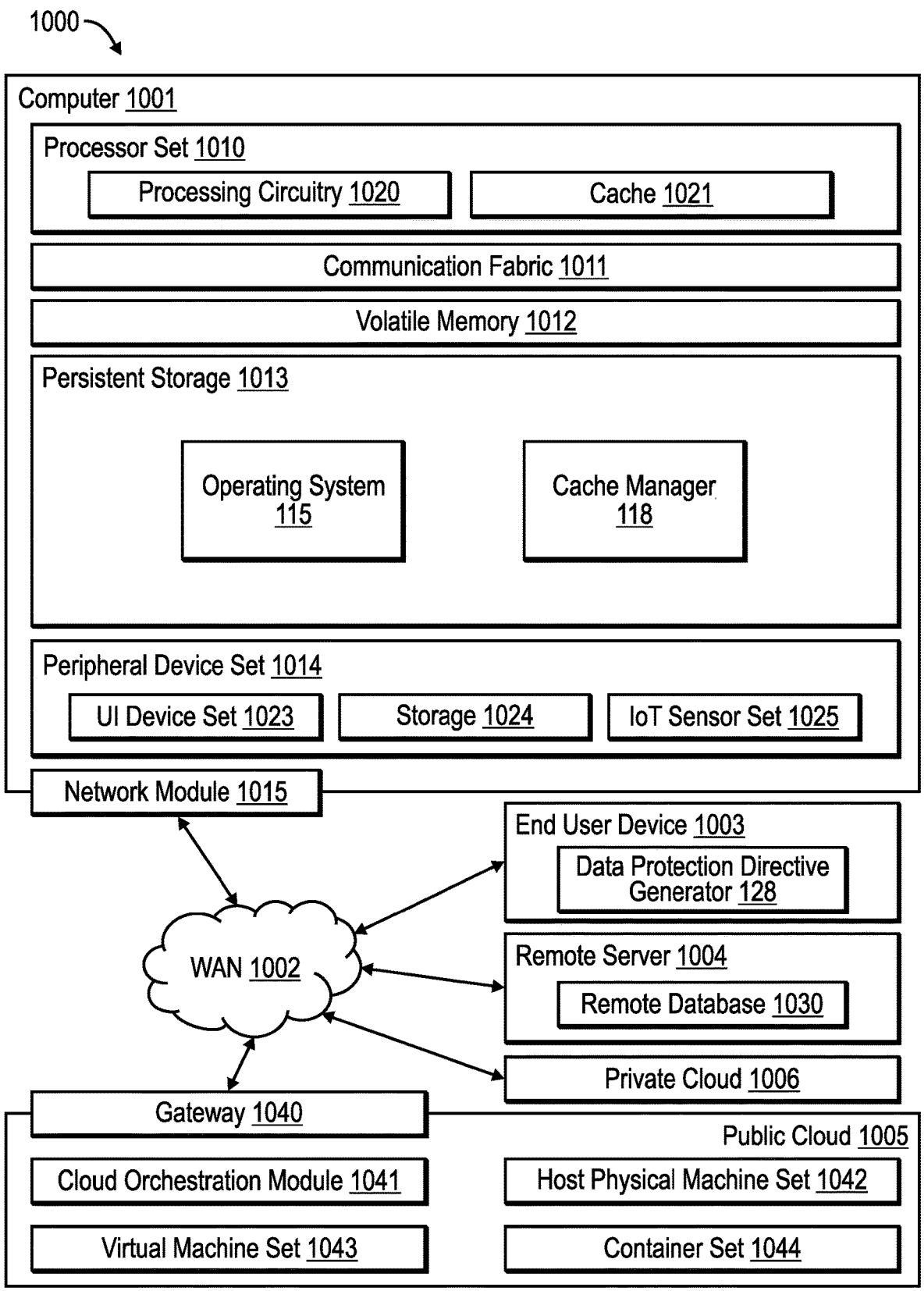
FIG. 10 illustrates a computing environment in which the components of FIG. 1 may be implemented.

With respect to FIG. 10, computing environment 1000 contains an example of an environment for the execution of at least some of the computer code involved in performing the inventive methods, such as the operations of the data protection directive generator 128 to generate data protection directives into metadata 200 400, and/or 500 and the operations of the operating system 115/cache manager 118 in the storage controller 102 to process data protection directives in the metadata to determine whether to allow an access request to a track in the cache. In addition, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 115 and cache manager 118, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods of code 115 and 118 may be stored in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 115 may take several forms, such as various known proprietary operating systems or open source Portable Operating System Interface-type operating systems that employ a kernel. The code included in the persistent storage 1013 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on. In one embodiment, the EUD 1003 may comprise the host 100 systems, including a data protection directive generator 128 to include data protection directives $300_i$ within metadata 200, 400 and/or 500 for tracks maintained by the storage controller 102.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for protecting tracks transferred to a storage controller, the computer program product comprising a computer readable storage medium having computer readable program code embodied therein that when executed performs operations, the operations comprising:
    generating a data protection directive for a data subset, wherein the data protection directive includes fields identifying an access request type and a protective action with respect to the access request type for the data subset; and
    transmitting the data protection directive to the storage controller, wherein the storage controller includes the data protection directive in metadata for the data subset, wherein the data protection directive causes the storage controller to perform the protective action in response to an access request of the access request type to a portion of the data subset, and wherein the metadata including the data protection directive is destaged to storage and stored as metadata when the data subset for which the metadata is provided is destaged from cache.

2. The computer program product of claim 1, wherein the data protection directive comprises a previous data protection directive, and wherein the operations further comprise:
    generating an updated data protection directive indicating no data protection to transmit to the storage controller to cause the storage controller to update metadata indicating the previous data protection directive to indicate there is no data protection directive for the data subset.

3. The computer program product of claim 1, wherein the data protection directive comprises a first data protection directive, wherein the access request type comprises a first access request type, and wherein the protective action comprises a first protective action, wherein the operations further comprise:
    generating a second data protection directive for the data subset comprising a second access request type and a second protective action for the data subset; and
    transmitting the second data protection directive to the storage controller, wherein the second data protection directive causes the storage controller to update the metadata for the data subset with the second data protection directive and to cause the storage controller to perform the second protective action in response to an access request of the second access request type indicated in the second data protection directive directed to a portion of the data subset.

4. The computer program product of claim 1, wherein the data subset is a member of a set of data subsets consisting of: a track; a plurality of tracks; a data set; a record of a track; and a logical partition of tracks.

5. The computer program product of claim 1, further comprising:
generating a plurality of data protection directives for the data subset providing different protective actions and/or different access request types, wherein the causing the storage controller to perform the protective action comprises the storage controller performing each protective action in each data protection directive specifying an access request type of the access request.

6. The computer program product of claim 1, wherein the protective action indicates to block an access request for an access request type comprising one of a read request, a write request, and a data replication request, wherein the causing the storage controller to perform the protective action comprises the storage controller returning fail to the access request type.

7. The computer program product of claim 1, wherein the protective action indicates a secure key to use to authorize access to the portion of the data subset in cache for the access request type, wherein the causing the storage controller to perform the protective action comprises causing the storage controller to perform:
determining whether the access request provides a secure key matching the secure key indicated in the data protection directive;
allowing the access request to proceed against the portion of the data subset in the cache in response to determining that the access request provides the secure key; and
blocking the access request in response to determining that the access request does not provide the secure key.

8. The computer program product of claim 1, wherein the access request type indicated in the data protection directive indicates a write request, and wherein the causing the storage controller to perform the protective action comprises the storage controller performing a protective action, wherein the protective action is selected from the group consisting of:
creating a backup copy of the portion of the data subset in cache before allowing the write request to the data subset in the cache;
rejecting the write request with data indicating unauthorized access and that the data protection directive has been breached;
preventing further access to a logical partition including the data subset;
sending a message to an administrator alerting of a breach of the data protection directive;
alerting logical partitions other than the logical partition including the data subset of a breach of the data protection directive; and
returning success acknowledgment to the access request and generate an alert of suspicious behavior.

9. The computer program product of claim 1, wherein the data subset comprises a track comprised of a plurality of records and wherein either a data protection directive is generated or indication of no data protection directive is generated for each of a plurality of records in the track, wherein the causing the storage controller to perform the protective action comprises causing the storage controller to perform:
processing a data protection directive provided for a requested record to determine whether to allow access to the requested record in the track.

10. The computer program product of claim 1, wherein the data protection directive provides a protection period, wherein the causing the storage controller to perform the protective action comprises causing the storage controller to perform:
determining whether a current time is within the protection period in response to determining that the metadata indicates the data protection directive, wherein the determining whether the access request comprises the access request type of the data protection directive is performed in response to determining that the current time is within the protection period; and
allowing the access request to proceed against the portion of the data subset in cache in response to determining that the current time is not within the protection period.

11. The computer program product of claim 1, wherein the data subset comprises a volume, wherein the access request type comprises a write request, wherein the protective action specifies a section of the volume to which access is permitted, and wherein the protective action is selected from the group consisting of:
preventing writes to a portion of the volume outside the section of the volume to which access is permitted;
allowing writes to a portion of the volume outside the section in response to the access request providing a security key matching an authentication key indicated in the data protection directive; and
generating an alert indicating unauthorized activity in response to a write to a portion of the volume outside the section.

12. A system for protecting tracks transferred to a storage controller, comprising:
a processor; and
a computer readable storage medium having computer readable program code embodied therein that, when executed by the processor, performs operations, the operations comprising:
generating a data protection directive for a data subset, wherein the data protection directive includes fields identifying an access request type and a protective action with respect to the access request type for the data subset; and
transmitting the data protection directive to the storage controller, wherein the storage controller includes the data protection directive in metadata for the data subset,
wherein the data protection directive causes the storage controller to perform the protective action in response to an access request of the access request type to a portion of the data subset, and wherein the metadata including the data protection directive is destaged to storage and stored as metadata when the data subset for which the metadata is provided is destaged from cache.

13. The system of claim 12, wherein the data protection directive comprises a first data protection directive, wherein the access request type comprises a first access request type, and wherein the protective action comprises a first protective action, wherein the operations further comprise:
generating a second data protection directive for the data subset comprising a second access request type and a second protective action for the data subset; and
transmitting the second data protection directive to the storage controller, wherein the second data protection directive causes the storage controller to update the metadata for the data subset with the second data protection directive and to cause the storage controller to perform the second protective action in response to an access request of the second access request type indicated in the second data protection directive directed to a portion of the data subset.

14. The system of claim 12, wherein the access request type indicated in the data protection directive indicates a write request, and wherein the protective action is selected from the group consisting of:
  creating a backup copy of the portion of the data subset in cache before allowing the write request to the data subset in the cache;
  rejecting the write request with data indicating unauthorized access and that the data protection directive has been breached;
  preventing further access to a logical partition including the data subset;
  sending a message to an administrator alerting of a breach of the data protection directive;
  alerting logical partitions other than the logical partition including the data subset of a breach of the data protection directive; and
  returning success acknowledgment to the access request and generate an alert of suspicious behavior.

15. The system of claim 12, wherein the data subset comprises a track comprised of a plurality of records and wherein the generating the data protection directive comprises generating a data protection directive or indication of no data protection directive for each of a plurality of records in the track, wherein the causing the storage controller to perform the protective action comprises causing the storage controller to perform:
  processing a data protection directive provided for a requested record to determine whether to allow access to the requested record in the track.

16. The system of claim 12, wherein the data protection directive provides a protection period, wherein the causing the storage controller to perform the protective action comprises causing the storage controller to perform:
  determining whether a current time is within the protection period in response to determining that the metadata indicates the data protection directive, wherein the determining whether the access request comprises the access request type of the data protection directive is performed in response to determining that the current time is within the protection period; and
  allowing the access request to proceed against the portion of the data subset in cache in response to determining that the current time is not within the protection period.

17. A method for protecting tracks transferred to a storage controller, comprising:
  generating a data protection directive for a data subset, wherein the data protection directive includes fields identifying an access request type and a protective action with respect to the access request type for the data subset; and
  transmitting the data protection directive to the storage controller, wherein the storage controller includes the data protection directive in metadata for the data subset, wherein the data protection directive causes the storage controller to perform the protective action in response to an access request of the access request type to a portion of the data subset, and wherein the metadata including the data protection directive is destaged to storage and stored as metadata when the data subset for which the metadata is provided is destaged from cache.

18. The method of claim 17, wherein the data protection directive comprises a first data protection directive, wherein the access request type comprises a first access request type, and wherein the protective action comprises a first protective action, wherein the operations further comprise:
  generating a second data protection directive for the data subset comprising a second access request type and a second protective action for the data subset; and
  transmitting the second data protection directive to the storage controller, wherein the second data protection directive causes the storage controller to update the metadata for the data subset with the second data protection directive and to cause the storage controller to perform the second protective action in response to an access request of the second access request type indicated in the second data protection directive directed to a portion of the data subset.

19. The method of claim 17, wherein the access request type indicated in the data protection directive indicates a write request, and wherein the protective action is selected from the group consisting of:
  creating a backup copy of the portion of the data subset in cache before allowing the write request to the data subset in the cache;
  rejecting the write request with data indicating unauthorized access and that a data protection directive has been breached;
  preventing further access to a logical partition including the data subset;
  sending a message to an administrator alerting of a breach of a data protection directive;
  alerting logical partitions other than the logical partition including the data subset of a breach of the data protection directive; and
  returning success acknowledgment to the access request and generate an alert of suspicious behavior.

20. The method of claim 17, wherein the data protection directive provides a protection period, wherein the causing the storage controller to perform the protective action comprises causing the storage controller to perform:
  determining whether a current time is within the protection period in response to determining that the metadata indicates the data protection directive, wherein the determining whether the access request comprises the access request type of the data protection directive is performed in response to determining that the current time is within the protection period; and
  allowing the access request to proceed against the portion of the data subset in cache in response to determining that the current time is not within the protection period.

* * * * *